United States Patent Office 3,386,995
Patented June 4, 1968

3,386,995
1-SUBSTITUTED-3-(5-NITROFURFURYLIDENE-
AMINO)-2-IMIDAZOLIDINONES
Frank Frederick Ebetino, Norwich, N.Y., assignor to The
Norwich Pharmacal Company, a corporation of New
York
No Drawing. Continuation-in-part of application Ser. No.
305,214, Aug. 28, 1963. This application June 18, 1964,
Ser. No. 376,199
The portion of the term of the patent subsequent to
May 31, 1983, has been disclaimed
2 Claims. (Cl. 260—240)

ABSTRACT OF THE DISCLOSURE

Antibacterially active 1-substituted-3-(5-nitrofurfurylideneamino)-2-imidazolidinones and methods for their manufacture.

This is a continuation-in-part of my copending application Ser. No. 305,214 filed Aug. 28, 1963, now United States Patent No. 3,254,075 issued May 31, 1966.

This invention relates to new chemical compounds. More particularly this invention relates to new chemical compounds distinguished by a low order of toxicity and a high order of chemotherapeutic activity upon oral administration as well as being inimical to a wide range of parasites upon contact with them. Such compounds of this invention may be described as 1-substituted-3-(5-nitrofurfurylideneamino)-2-imidazolidinones of the formula:

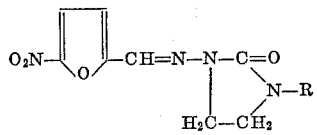

wherein R is hydroxymethyl or morpholinoethyl.

These compounds possess a broad antibacterial spectrum, inhibiting the growth of organisms such as *Staphylococcus aureus, Escherichia coli, Streptococcus agalactiae, Erysipelothrix insidiosa* and *Aerobacter aerogenes* in very small amounts of the order of from 0.31 to 1.5 mg. percent. They are thus adapted to be employed as the toxic constituent of compositions designed to effect the eradication of bacterial growth. They may conveniently be composed for such purpose in the form of dusts, sprays, ointments and the like.

In addition, these compounds are effective systemic chemotherapeutic agents. Upon oral administration to mice lethally infected with *Staphylococcus aureus*, protection against death is secured in 50% of the animals by a dose of from about 33 to 118 mg./kg. When fed to chickens infected with *Eimeria tenella*, mortality and morbidity is curtailed. In this application, a poultry feed containing about 0.022% by weight of these compounds is highly effective.

The compounds of this invention are further distinguishde by their resistance to metabolic destruction when fed to animals. When administered to rats perorally at a dose of 10 mg./kg. from 16 to 35% of that dose is excreted in the urine, rendering it antibacterial. Such a property makes these compounds valuable agents in the treatment of urinary tract infections.

The methods which may be contemplated for the production of these new compounds comprise bringing together 5-nitrofurfural or a derivative thereof, such as the diacetate or oxime, which is readily hydrolyzable thereto and the appropriately 1-substituted-3-amino-2-imidazolidinone in the presence of a suitable solvent such as the alkanols. The product of the reaction separates as a solid which is recovered in conventional fashion and may be recrystallized, if desired, from suitable solvents such as alkanols, dimethylformamide, dimethylsulfoxide, acetonitrile and mixtures thereof.

The method which is currently preferred consists in reacting 2-(2-aminoethylamino) ethanol with urea under the influence of heat to obtain 1-(2-hydroxyethyl)imidazolidinone; nitrosation of it with a suitable agent such as sodium nitrite in the presence of acid, followed by hydrogenation to produce the amino compound. Hydrogenation may be readily effected with a metal, such as zinc, in the presence of an acid, such as hydrochloric or sulfuric. The amino compound thus obtained may be reacted with 5-nitrofurfural to produce the desired compound 1-(2-hydroxyethyl) - 3 - (5 - nitrofurfurylideneamino)-2-imidazolidinone. This hydroxyethyl compound when subjected to a halogenating agent such as thionyl chloride is readily converted to the corresponding halo compound.

Alternatively the 1-(2-hydroxyethyl)3-amino-2-imidazolidinone may be condensed with a carbonyl containing compound such as benzaldehyde to form a hydrazone which is readily susceptible to exchange by nitrofurfural in the presence of a hydrolytic medium. For instance, 1-(2 - hydroxyethyl)-3-(benzylideneamino)-2-imidazolidinone in the presence of an inert reaction medium such as aqueous alkanol and under the influence of heat and an acid is converted to 1-(2-hydroxyethyl)-3-(5-nitrofurfurylidineamino)-2-imidazolidinone.

The aforesaid 1-(2-hydroxyethyl)-3-(benzylideneamino)-2-imidazolidinone also may serve as a starting material in the preparation of other compounds comprehended by this invention. Thus, when it is treated with a halogenating agent such as thionyl chloride the corresponding halo compound is produced which when contacted with a secondary amine yields tertiaryaminoalkyl derivatives. For instance, 1-(2-chloroethyl)-3-(benzylideneamino)-2 - imidazolidinone when contacted with morpholine in the presence of an inert solvent such as benzene and under the influence of heat yield 1-(2-morpholinoethyl)-3-(benzylideneamino)-2 - imidazolidinone. This benzylidene compound is readily converted to the corresponding nitrofurfurylidene compound by suspending it in aqueous medium, adding a strong acid such as hydrochloric and then nitrofurfural or a derivative thereof of hydrolyzable thereto such as its diacetate. Other secondary amines behave in a similar fashion.

In the production of the 1-hydroxymethyl-3-(5-nitrofurfurylideneamino)-2-imidazolidinone comprehended in this invention a very simple route may be followed: viz, 1-(5-nitrofurfurylideneamino)-2 - imidazolidinone upon treatment with formalin solution under the influence of heat readily yields the sought for compound.

The antimicrobial compounds of this invention may be readily compounded and formulated in accordance with pharmaceutical practice using those adjuvants and carriers with which there is no incompatibility.

In order that this invention may be readily available to and understood by those skilled in the art, the following examples for preparing the compounds thereof are appended.

Example I.—1-(2-hydroxyethyl)-3-(5-nitrofurfurylideneamino)-2-imidazolidinone (A) To 360 g. (3.46 moles) of 2-(2-aminoethylamino)ethanol is added 204 g. (3.3 moles) of urea in a 1 l. flask with an air condenser. The mixture is heated, and at 100° ammonia evolves. The temperature is gradually increased to 230° to maintain the evolution of ammonia for about 2¾ hours. The solution is allowed to cool overnight. The solid is melted and poured from the flask. On cooling the liquid solidified to give 435 g. (100%) of 1-(2-hydroxyethyl)-2-imidazolidinone, M.P. 53.5–57.5°, which is used in the next step without purification.

(B) To 362 g. (2.78 moles) of 1-(2-hydroxyethyl)-2-imidazolidinone dissolved in 7.625 l. of 10% sulfuric acid is added at 5° over 15 mins. 206 g. (3 moles) of sodium nitrite while maintaining the temperature at 5°. After stirring at 0–5° for 1¼ hours, 420 g. (6.45 moles) of zinc dust is added over 45 mins. at a temperature below 20°. The mixture is stirred for 1 hour and filtered. To 1945 ml. (25%) of the filtrate is added a solution of 86 g. (0.61 mole) of 5-nitrofurfural dissolved in 600 ml. of ethanol. After cooling overnight the orange precipitate is filtered, rinsed with 50% ethanol and dried at 60°. The yield of title product is 152 g. (82%), M.P. 194–195°.

*Analysis.*—Calc. for $C_{10}H_{12}N_4O_5$: C, 44.78; H, 4.51; N, 20.89. Found: C, 44.86; H, 4.56; N, 20.88.

Example II.—1-(2-chloroethyl)-3-(5-nitrofurfurylideneamino)-2-imidazolidinone

To a 400 ml. of thionyl chloride is added in portions 152 g. (0.565 mole) of the compound of Example I. The clear solution is heated at reflux temperature for 30 minutes, cooled in an ice bath and filtered. The solid is washed with benzene and the benzene washings are added to the reaction filtrate to give a second crop of solid. The total yield is 92 g. (57%), M.P. 184–185°. Recrystallization from a mixture of 4.25 l. of ethanol and 700 ml. of acetonitrile using charcoal gives 75 g. of title product, M.P. 195–196°.

*Analysis.*—Calc. for $C_{10}H_{11}ClN_4O_4$: C, 41.95; H, 3.87; Cl, 12.37. Found: C, 41.93; H, 3.80; Cl, 12.39.

Similar results are obtained when a brominating agent is used.

Example III.—1-(2-morpholinoethyl)-3-(5-nitrofurfurylideneamino)-2-imidazolidinone hydrochloride (A) 3-benzylideneamino-1-(2-hydroxyethyl)-2-imidazolidinone.—To an aqueous acidic solution of 3-amino-1-(2-hydroxyethyl)-2-imidazolidinone (2 moles) is added 450 g. of sodium acetate to bring the pH to 4–6. The mixture is heated to 40° and treated with a solution of 212 g. (2 moles) of benzaldehyde in 600 ml. of ethanol. After heating on a steam bath for 1½ hours the mixture is cooled and filtered. The white solid is washed with 2× 200 ml. of 25% ethanol and then with water. (364 g. (78%), M.P. 184–186° C.)

(B) 3-benzylideneamino-1-(2-chloroethyl)-2-imidazolidinone.—To 680 ml. of thionyl chloride is added portionwise 340 g. (1.46 moles) of the (A) compound and then the mixture is heated on a steam bath for 1 hour. After cooling, the solution is poured into a mixture of 1700 ml. of benzene and 1700 ml. of ether and further cooled in the refrigerator. The solid is filtered and rinsed with ether. The combined filtrates are cooled to cause precipitation of more solid. The solids are added to ice water, filtered and slurried with cold water. The slurry is then adjusted to pH 8 with saturated sodium carbonate solution and filtered. The solid is rinsed with cold water and dried at 60° to yield: 338 g. (92%), M.P. 116–117° of 3-benzylideneamine-1-(2-chloroethyl)-2-imidazolidinone.

(C) 3-benzylideneamino-1-(2-morpholinoethyl)-2-imidazolidinone.—To 75 g. (0.3 mole) of the compound of (B), in 300 ml. of benzene is added 52 g. (0.6 mole) of morpholine. The mixture is heated at reflux temperature for 7 hours and then allowed to cool. The solid is filtered, rinsed with ether and then washed with cold water. After drying at 60° to constant weight a yield of 80 g. (89%) product is obtained.

(D) 1-(2-morpholinoethyl)-3-(5-nitrofurfurylideneamino)-2-imidazolidinone hydrochloride.—A suspension of 80 g. (0.265 mole) of the compound of (C), in 250 ml. of water is acidified to pH 2 with 95 ml. of 10% hydrochloric acid. Any insoluble solid is filtered and the filtrate treated with 155 ml. of 10% hydrochloric acid. The solution is heated on the steam bath and while hot is treated with 30.6 g. (0.217 mole) of 5-nitro-2-furaldehyde. After heating for 30 mins. with occasional stirring, the mixture is cooled and extracted with chloroform. The water layer is immediately filtered and cooled. The solid is filtered and dried at 110° to yield: 65 g. (80%), M.P. 245–250° (dec.) of 1-(2-morpholinylethyl)-3-(5-nitrofurfurylideneamino)-2-imidazolidinone hydrochloride.

The salt may be readily converted to its base by treatment with a base such as sodium carbonate.

*Analysis.*—Calc.: C, 45.00; H, 5.40; Cl, 9.48. Found: C, 45.08; H, 5.40; Cl, 9.44.

Example IV.—1-hydroxymethyl-3-(5-nitrofurfurylideneamino)-2-imidazolidinone

To a refluxing solution of 5% aqueous formaldehyde (2 liters) is added 1-(5-nitrofurfurylideneamino)-2-imidazolidinone (60 g., 0.267 mole). The mixture is stirred at reflux for 5 min. and filtered hot, and the filtrate cooled. The precipitated orange plates of 1-hydroxymethyl-3-(5-nitrofurfurylideneamino)-2-imidazolidinone are separated by filtration and washed with 1% aq. formaldehyde (200 ml.). After drying in a desiccator at room temperature, a yield of 14.4 g. (21%) is obtained, M.P. 200°.

*Analysis.*—Calc. for $C_9H_{10}N_4O_5$: C, 42.52; H, 3.97; N, 22.04. Found: C, 42.41; H, 4.17; N, 22.14.

What is claimed is:

1. The compound 1-hydroxymethyl-3-(5-nitrofurfurylideneamino)-2-imidazolidinone of the formula:

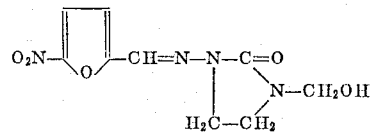

2. The compound 1-(2-morpholinoethyl)-3-(5-nitrofurfurylideneamino)-2-imidazolidinone of the formula:

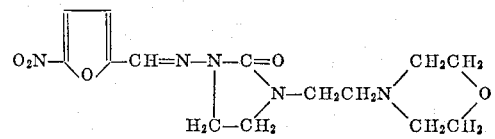

References Cited

UNITED STATES PATENTS

| 2,887,485 | 5/1959 | Yost | 260—309.7 |
| 3,075,973 | 1/1963 | Michels | 260—240 |
| 3,076,805 | 2/1963 | Michels | 260—240 |
| 3,097,202 | 7/1963 | Michels | 260—240 |
| 3,182,058 | 5/1965 | Conover | 260—240 |
| 3,254,075 | 5/1966 | Ebetino | 260—240 |

FOREIGN PATENTS 963,049  7/1964  Great Britain.

JOHN D. RANDOLPH, *Primary Examiner.*